3,034,855
PROCESS FOR THE PREPARATION OF UF₃

William A. Jenkins, Wilmington, and John H. Kennedy, Claymont, Del., assignors to E. I. du Pont de Nemours and Company, Wilmington, Del., a corporation of Delaware
No Drawing. Filed Apr. 28, 1958, Ser. No. 731,109
2 Claims. (Cl. 23—14.5)

The present invention relates to a process for preparing stable solutions of uranium salts wherein the uranium exists in the plus three oxidation state, said solutions being uncontaminated with uranium compounds of other oxidation states. The present invention relates, in addition, to the use of such solutions for the preparation of uranium trifluoride. More particularly, the present invention relates to the quantitative reduction of uranium salts to ($U^{+++}$) from which the uranium trifluoride may be obtained.

The preparation of uranium (III) compounds has heretofore only been possible by means of high temperature heterogeneous reactions. For example, it is possible to reduce 2 moles of uranium tetrafluoride with 1 mole of hydrogen at about 1000° C. to obtain 2 moles of uranium trifluoride. In this reaction, 2 moles of hydrogen fluoride is obtained as a by-product. The prior art also suggests that uranium trifluoride may be obtained at temperatures in the neighborhood of 1050° C. by heating uranium metal with uranium tetrafluoride. These techniques, however, necessitate the use of very high temperatures, as indicated, and in the case of reduction with hydrogen requires the handling of hydrofluoric acid, which is highly corrosive.

It is an object of the present invention to provide a process for the preparation of stable aqueous solutions of uranium salts in the plus three oxidation state. It is a further object of the invention to provide such a process by quantitative reduction of uranium salts which may be run at room temperatures and which uses economical reagents and standard equipment. It is a still further object of the present invention to provide a technique whereby solid uranium trifluoride may be obtained from such uranium (III) solutions. These and other objects of the present invention will become apparent from a consideration of the ensuing specification and claims.

The prior art suggests that the reduction of uranium in a "Jones Reductor" will yield some tri-valent uranium. However, prior art workers have not succeeded in obtaining quantitative reduction of uranium in its higher oxidation states to uranium (III). In fact, the prior art literature indicates that it is not possible to obtain quantitative reduction to the plus three oxidation state. Attempts have also been made to precipitate uranium trifluoride from aqueous solution, but up to the time of the present invention, such attempts have not been successful.

According to the present invention, it is possible to obtain quantitative reduction of uranyl salts to ($U^{+++}$) by reduction with a zinc amalgam under carefully controlled reaction conditions. As used herein, the term "quantitative reduction" is intended to encompass reduction of 90% or more of the uranium. The critical conditions, which will be more particularly hereinafter described, must be carefully observed if quantitative reduction is to be accomplished. Uranium trifluoride may be precipitated directly from the ($U^{+++}$) solution by addition of the latter to a solution of a soluble fluoride.

A more complete understanding of the invention will be gained from a consideration of the following examples.

Example 1

40 ml. of a uranyl chloride solution containing 0.05 molar uranium and 1 molar hydrochloric acid were passed through a zinc amalgam reductor column (5% mercury, 95% 20-mesh zinc). The effluent solution was added to 20 ml. of a solution containing 0.4 gm. ammonium fluoride and acidified to pH 1 with hydrochloric acid. The solution and reaction flask were kept in a nitrogen atmosphere throughout. The resulting precipitate was allowed to digest at room temperature for ten minutes and then filtered through a medium pore sintered glass crucible. The solid was washed with 50 ml. of de-aerated acetone.

Analyses showed the compound to consist of 74.9% uranium, 18.4% fluoride (a mole ratio of 1:3) with 0.1% zinc, 0.1% chloride and 6.5% water (by difference) impurities. As additional evidence for its composition, the solid was found to dissolve in concentrated hydrochloric acid to yield a deep red solution indicative of tri-valent uranium. Spectrophotometric measurements showed all the uranium to be in the plus three oxidation state when first dissolved.

Example 2

10.6440 gm. uranyl acetate was dissolved in 100 ml. 1 M perchloric acid and the solution standardized by the analytical technique of Kolthoff and Lingane (J.A.C.S., 55 (1933) 1371). The molarity was found to be 0.2490 M. 10 ml. of this solution was diluted to 50 ml. making it about 0.2 M perchloric acid and 0.05 M in uranyl ion. This solution was passed through a zinc amalgam column of the type used in Example 1. Titration with standard $KMnO_4$ solution showed 97.0% of the uranium to have been reduced to the plus three oxidation state.

Example 3

The procedure of Example 2 was repeated except that perchloric acid concentration 3 M was used instead of 0.2 M. Titration with standard $K_2Cr_2O_7$ solution showed 99.4% of the uranium emerged from the column in the plus three oxidation state.

Example 4

The procedure of Example 2 was repeated except that 0.5 M hydrochloric acid was used in place of 0.2 M perchloric acid. The uranyl acetate was dissolved in the hydrochloric acid. Titration with standard $K_2Cr_2O_7$ solution showed 97.4% of the uranium emerged from the column in the plus three oxidation state.

Example 5

The procedure of Example 2 was repeated except that 3 M hydrochloric acid was used in place of 0.2 M perchloric acid. The uranyl acetate was dissolved in the hydrochloric acid. Titration with standard $K_2Cr_2O_7$ solution showed 100% of the uranium emerged from the column in the plus three oxidation state.

Example 6

The procedure of Example 1 was repeated except that sodium fluoride was substituted for the ammonium fluoride. The precipitate appeared the same as the uranium trifluoride formed in Example 1, although showed 73.4% uranium which is a little less, indicating a little more adsorbed water. The compound dissolved in hydrochloric acid to give a deep-red solution.

Example 7

A sample of ammonium diuranate (containing 0.1558 gram U) was dissolved in 100 ml. 1 M HCl (at room temperature) and passed through a zinc amalgam reductor column of the type used in Example 1. Titration of the effluent solution with standard potassium dichromate solution showed that the uranium which it contained was 99.5% in the plus three oxidation state.

Example 8

A sample of $U_3O_8$ weighing 0.1245 gram was dissolved in hot concentrated HCl, then cooled and diluted until the solution was 1 M hydrochloric acid. The solution was passed through a zinc amalgam reductor column of the type used in Example 1. 98.0% of the uranium emerged in the plus three oxidation state as measured with standard $K_2Cr_2O_7$ solution.

If the reduction of the uranyl ion to the trivalent state is to be essentially quantitative, i.e., greater than about 90%, it is necessary that the concentration of the hydrogen ion in the starting solution be at least 0.5 molar and that the uranium concentration be less than 0.2 molar. There is no upper limit to the acid concentration except the resistance of the column to acid attack or where uranium trifluoride is sought as the ultimate end-product. In the latter case, the upper limit of acid concentration will be dictated by the solubility of the uranium trifluoride. $UF_3$ will dissolve to a substantial extent when acidity exceeds 2 molar. The reduction column itself is quite stable in the presence of acid except in cases of extremely high acid concentration, such as about 5 molar or higher. There is no lower limit to the uranium concentration from the standpoint of operability. As a practical matter the lower limit would be governed by economic considerations and by ease of handling.

A critical factor in the operability of the process is the avoidance of conditions conducive to oxidation of uranium (III). Oxygen should be carefully and completely excluded from the system throughout the reaction. The process is thus carried out entirely in an inert atmosphere, such as under nitrogen or other inert gas. In addition to being non-oxidative, the reaction conditions must be generally inert to the uranium except, of course, for permitting the reduction to take place without interference or inhibition. In this connection, it is important that the system be free from any uranium (IV) ion-stabilizing anions which will stabilize uranium (IV) and thus inhibit reduction of the uranium to the plus three oxidation state. Such stabilizing ions, e.g., sulfate, nitrate, phosphate and similar metal ion-complexing agents, will reduce the concentration of $[U^{++++}]$ and consequently render the quantitative reduction to uranium (III) energetically unfeasible.

Thus, the acidity of the starting solution may be achieved with any acid which will not complex uranium (IV) to any substantial extent. In this connection the chlorine-containing inorganic acids such as HCl, $HClO_4$, etc., are preferred. Sulfuric, nitrate, and phosphoric acids cannot be used, for the reasons outlined above.

For precipitation of uranium trifluoride, the uranium (III) solution should be added to the fluoride solution and not vice versa to avoid the precipitation of an unstable uranium compound which is quickly oxidized to the plus four oxidation state. The concentration of the fluoride ion is preferably in the neighborhood of the stoichiometric amount needed to form uranium trifluoride. The fluoride may be present in amounts greater than this, but for practical reasons is preferably present in no more than about three times the stoichiometric amount to avoid a precipitate which is difficult to filter and which will contain fluoride in addition to the uranium trifluoride.

Temperature is not a vital factor in the operability of the invention. Quantitative reductions to uranium (III) have been obtained at temperatures as low as 5° C. and up to as high as the vicinity of the boiling point of the acid solution.

The starting material may be any suitable uranyl compound having a non-U(IV)-complexing anion such as uranyl chloride, uranyl acetate, uranium dioxide, uranium trioxide, uranium tritaoctoxide, etc.

Precipitation of uranium trifluoride may be accomplished with any soluble fluoride such as ammonium fluoride, sodium fluoride, potassium fluoride, bi-fluoride, and the like.

Precipitation of uranium trifluoride by means of the present invention is a useful technique for the purification of uranium. The uranium trifluoride is a valuable intermediate in the production of uranium metal since it may be reduced to the metal by thermal decomposition or by reaction with calcium. See for example Katz, J. J. and Rabinowitch, E., "The Chemistry of Uranium," Natl. Nucl. Eng. Ser., VII–5, published by McGraw-Hill Book Co., Inc. (1951), pages 353–354.

The process of the present invention makes possible the quantitative reduction of uranium compounds to uranium (III) and the precipitation of uranium trifluoride from aqueous solution. It will be readily apparent to those skilled in the art that many variations may be made in the procedures described without departing from the spirit of the invention. It is intended, therefore, to be limited only by the following claims.

We claim:

1. A process for the preparation of $UF_3$ which comprises reducing an HCl solution of a uranium compound in the presence of a zinc amalgam, and separating said solution from the zinc amalgam, the hydrogen ion concentration of said solution being at least about 0.5 molar and the uranium concentration of said solution being less than 0.2 molar, and thereafter reacting the reduction product with a solution of a soluble fluoride by addition of the former to the latter, said entire process being perforated under non-oxidative conditions which do not interfere with the aforesaid reduction but which are otherwise inert with respect to the uranium.

2. A process as in claim 1 wherein the uranium compound which is reduced is selected from the group consisting of uranium oxides, uranium acetates, and metal uranates.

References Cited in the file of this patent

UNITED STATES PATENTS 2,761,758    Long et al. _____ Sept. 4, 1956

OTHER REFERENCES

Warf et al.: CC–1525 Mar. 14, 1944, AEC (available from USAEC Tech. Info. Serv.).

Kraus: CC–342, Nov. 15, 1947, AEC (available from USAEC Tech. Info. Serv.).

Simmler: NYO–5217, Jan. 21, 1948 (date declassified June 15, 1956), pp. 1–7.

Katz et al.: The Chemistry of Uranium, (1951), pp. 349–359, McGraw-Hill Book Co., Inc., New York.

Sneed et al.: Comprehensive Inorganic Chemistry, vol. I (By G. T. Seaborg), page 195 (1953). (Copy in Scientific Library.)

Simmler et al.: Nuclear Science Abstracts, vol. 10, No. 11, June 15, 1956, abstract No. 3453. Copy in Scientific Library.

TID 5290 Book I, page 86, USAEC Technical Information Service Extension (1958), Oak Ridge, Tenn.